US006286226B1

(12) United States Patent
Jin

(10) Patent No.: US 6,286,226 B1
(45) Date of Patent: Sep. 11, 2001

(54) TACTILE SENSOR COMPRISING NANOWIRES AND METHOD FOR MAKING THE SAME

(75) Inventor: Sungho Jin, Millington, NJ (US)

(73) Assignee: Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 09/405,641

(22) Filed: Sep. 24, 1999

(51) Int. Cl.[7] .......................... G01B 21/00; G01P 13/00; H01H 3/16

(52) U.S. Cl. ......................... 33/706; 200/61.41; 73/865.1

(58) Field of Search ............................ 33/706, 707, 708; 324/133; 73/865.7; 340/407.1; 345/173; 200/61.41, 61.13; 273/371–377

(56) References Cited

U.S. PATENT DOCUMENTS

| | | | | |
|---|---|---|---|---|
| 5,777,606 | * | 7/1998 | Kurashima et al. | 345/173 |
| 6,123,819 | * | 9/2000 | Peeters | 204/403 |
| 6,147,680 | * | 11/2000 | Tareev | 345/173 |
| 6,155,570 | * | 2/2000 | Allison et al. | 273/373 |
| 6,188,391 | * | 2/2001 | Seely et al. | 345/173 |

OTHER PUBLICATIONS

Fan et al., “Self–Oriented Regular Arrays of Carbon Nanotubes and Their Field Emission Properties”, Jan. 22, 1999, vol. 283 Science, pp. 512–514.

Kong et al., “Synthesis of Individual Single–Walled Carbon Nanotubes on Pattered Silicon Wafers”, vol. 395 Nature, Oct. 29, 1998, pp. 878–881.

Li et al., “Large–Scale Synthesis of Aligned Carbon Nanotubes”, vol. 274 Science, Dec. 6, 1996, pp. 1701–1703.

Ren et al., “Synthesis of Large Arrays of Well–Aligned Carbon Nanotubes on Glass”, vol. 282, Nov. 6, 1998, Science, pp. 1105–1107.

* cited by examiner

*Primary Examiner*—Diego Gutierrez
*Assistant Examiner*—R. Alexander Smith
(74) *Attorney, Agent, or Firm*—Lowenstein Sandler PC

(57) ABSTRACT

A tactile sensor device is disclosed that can be used for high resolution tactile sensing. The sensor may be used as a tactile shear sensor. It comprises a circuit substrate; an array of contact pads on the circuit substrate, and a set of nanowires attached to each of the contact pads. The contact pads may be isolated or formed from a matrix of interconnecting strips of material. Each set of nanowires comprises at least one and preferably a plurality of nanowires that are desirably vertically aligned and equal in length. When an object contacts at least one of the plurality of sets of nanowires, it causes at least one set of nanowires to bend and make contact along a portion of the length thereof with at least another set of nanowires. The position and movement activity of the object can be sensed by electrically interrogating pairs of contact pads to determine whether a connection has been made between them.

20 Claims, 7 Drawing Sheets

TACTILE SENSOR COMPRISING NANOWIRES AND METHOD FOR MAKING THE SAME

RELATED APPLICATIONS

This application is related to U.S. patent application Ser. No. 09/426,457, titled "Article Comprising Vertically Nano-Interconnected Circuit Devices and Method for Making the Same," filed by inventors Brown and Jin, and U.S. patent application Ser. No. 09/426,453, titled "In-situ Nano-interconnected Circuit Devices and Method for Making the Same," also filed by inventors Brown and Jin, both of which are assigned to the present assignee and incorporated herein by reference.

FIELD OF THE INVENTION

This invention relates to a tactile sensor device using nanowires and more particularly, to a high-resolution tactile sensor comprising vertically aligned nanowires. The invention has many applications including use in touch-sensitive controllers in computer-related and robotic products.

BACKGROUND OF THE INVENTION

Sensors are used in a variety of modem devices and transducers. Tactile sensors are useful in a wide variety of applications for robotics and computer hardware. In robotics, tactile sensors provide useful information about the state of contact between a robot hand and an object in prehension. Sensors can indicate the presence or shape of an object, its location in the hand, and the force of contact. However, most robotic sensors are based on a pressure sensor design and can measure only compressive force without regard to shear movement. Shear sensors would be useful, for example, in detecting the movement of a grasped object.

Most controls for computer-related products are pressure-sensitive devices such as keys. Controllers such as the computer "mouse" or the computer "joy-stick" respond to movement in two dimensions but are relatively complex to manufacture and subject to mechanical failure. Accordingly, there exists a need for simple, compact tactile shear sensors for robotic and computer applications. High resolution tactile sensors are useful for accurate control devices such as for high-density, miniature computer products, for highly sensitive robotic skin sensing, or for touch-sensitive virtual reality devices such as control gloves worn by a remote operator or the fingers of a robot used for surgical operation of patients.

Nano-scale wires such as carbon nanotubes with a very small size scale, on the order of 1–100 nanometers in diameter and 0.1–100 $\mu$m in length, have received considerable attention in recent years. See Liu et al., Science, Vol. 280, p. 1253 (1998); Ren et al., Science, Vol. 282, p. 1105 (1998); Li et al., Science, Vol. 274, p. 1701 (1996); Frank et al., Science, Vol. 280, p. 1744 (1998); J. Tans et al., Nature, Vol. 36, p. 474 (1997); Fan et al., Science, Vol. 283, p. 512 (1999); Collins et al., Science, Vol. 278, p. 100 (1997); Kong et al., Nature, Vol. 395, p. 878 (1998); and Ebbesen et al., Nature, Vol. 382, p. 54 (1996).

Carbon nanotubes exhibit unique atomic arrangements, nano-scale structures and interesting physical properties such as one-dimensional electrical behavior, quantum conductance, and ballistic transport characteristics. The ballistic transport in carbon nanotubes, as reported by Frank et al, allows the passage of huge electrical currents in electronic circuits, with the magnitude of current density comparable to or better than those in some superconductors. Carbon nanotubes are one of the smallest dimensioned nanowire materials with generally high aspect ratio and small diameter of ~1 nm in the case of single-wall nanotubes and less than ~50 nm in the case of multi-wall nanotubes. See Rinzler et al, Appled Physics, Vol. A67, p. 29 (1998); Kiang et al, J. Physical Chem., Vol. 98, p. 6612 (1994), and Kiang et al, Physical Review Letters, Vol. 81, p. 1869 (1998).

High-quality single-walled carbon nanotubes are typically grown as randomly oriented, needle-like or spaghetti-like, tangled nanotubes by laser ablation or arc techniques (a chemical purification process is usually needed for arc-generated carbon nanotubes to remove non-nanotube materials such as graphitic or amorphous phase, catalyst metals, etc). Chemical vapor deposition (CVD) methods such as used by Ren et al., Fan et al., and Li et al tend to produce multiwall nanotubes attached to a substrate, often with a semi-aligned or an aligned, parallel growth perpendicular to the substrate. As described in these articles, catalytic decomposition of hydrocarbon-containing precursors such as ethylene, methane, or benzene produces carbon nanotubes when the reaction parameters such as temperature, time, precursor concentration, flow rate, are optimized. Nucleation layers such as a thin coating of Ni, Co, Fe, etc. are often intentionally added to the substrate surface to nucleate a multiplicity of isolated nanotubes. Carbon nanotubes can also be nucleated and grown on a substrate without using such a metal nucleating layer, e.g., by using a hydrocarbon-containing precursor mixed with a chemical component (such as ferrocene) which contains one or more of these catalytic metal atoms. During the chemical vapor decomposition, these metal atoms serve to nucleate the nanotubes on the substrate surface. See Cheng et al., Chem. Physics letters, Vol. 289, p. 602 (1998).

The as-grown single-wall nanotubes (SWNT) such as commonly synthesized by laser ablation or arc method, have a spaghetti-like configuration and often are tangled with each other. The multi-wall nanotubes (MWNT), such as commonly made by chemical vapor deposition, are easier to prepare in an aligned and parallel configuration. However, these as-grown nanotubes such as reported by Ren et al. and Li, et al. differ in height or length. Applicants have discovered a high-resolution tactile sensor may be fabricated with nanowires vertically attached to a sensor substrate such that, upon tactile contact, the nanowires make physical and electrical contacts between them such that presence of tactile shear or compression contact can be determined by electrical interrogation. For reliable tactile sensors as disclosed in this invention, the nanowires should be substantially vertically aligned and of equal length, such that prior methods of making SWNT and MWNT are generally unsuitable for the inventive high-resolution tactile sensors.

SUMMARY OF THE INVENTION

Summarily described, the invention embraces a tactile sensor device for detecting the position and movement activity of an object. The sensor device includes a circuit substrate; an array of contact pads on the circuit substrate, and a set of nanowires attached to each of the contact pads. The contact pads may be isolated or formed from a matrix of interconnecting strips of material, and each one of the contact pads defining the array is, in the absence of tactile activation, electrically isolated from adjacent contact pads defining the array. Each set of nanowires comprises at least one and preferably a plurality of nanowires that are advantageously substantially-vertically aligned and substantially equal in length. With this configuration, when an object contacts at least one of the plurality of sets of nanowires, it causes at least one set of nanowires to bend and make contact along a portion of the length thereof with at least another set of nanowires. The position and movement activity of the object can be sensed by electrically interrogating the contact pads to determine whether a connection has been made between sets of nanowires.

BRIEF DESCRIPTION OF THE DRAWINGS

For a better understanding of the invention, an exemplary embodiment is described below, considered together with the accompanying drawings, in which.

It is to be understood that these drawings are for the purposes of illustrating the concepts of the invention and are not to scale. Like reference numerals are used in the figures to refer to like features.

DETAILED DESCRIPTION OF THE INVENTION

Figure 1A:
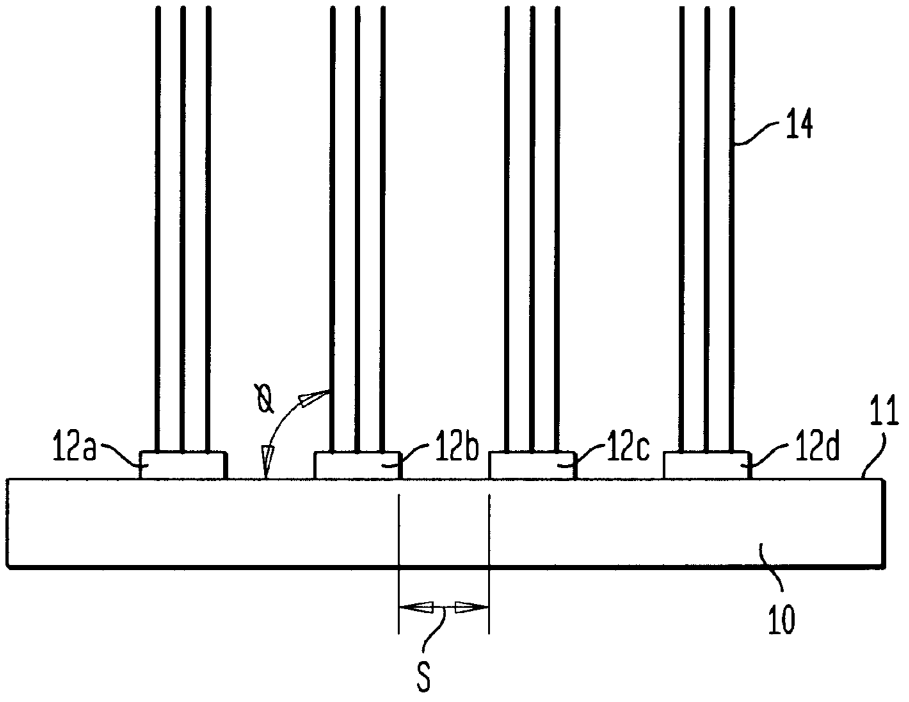
FIG. 1A schematically illustrates a cross-sectional side view of a basic configuration for the inventive sensor.

This invention embraces a nano-scale tactile sensor structure capable of high-resolution tactile sensing. Referring to FIG. 1A, there is schematically illustrated a cross-sectional side view of an exemplary embodiment of the inventive tactile sensor. The sensor comprises a substrate 10 containing sensing circuitry (not shown) and a surface 11, with an array of contact pads 12*a*, 12*b*, 12*c*, 12*d* and a plurality of nanowires 14 on the contact pads. The array of contact pads comprises at least two pads and preferably comprises a multiplicity of pads. At least one nanowire is secured to each one of the contact pads forming the array, and preferably, a multiplicity (e.g., up to five or more) nanowires are secured to each pad. The nanowires 14 advantageously are vertically aligned relative to the substrate and disposed substantially in parallel. Thus, ordinarily they are vertically arranged and laterally isolated. Full vertical alignment of the nanowires (e.g., where angle ϕbetween the surface of the contact pad 11 and the length of the nanowire is 90°) is not necessary. However, preferably the deviation from complete vertical alignment is insubstantial, that is, it is less than about 25 degrees and preferably less than 15 degrees from full (90°) alignment.

The diameter of each nanowire is typically less than about 500 nm and preferably less than 200 nm. The height of each nanowire is typically in the range of about 0.1 to 500 micrometers and preferably from 1–100 micrometers. Advantageously, the nanowires are sufficiently long and thin to achieve a high aspect ratio and mechanical compliancy. At the same time, there are constraints to lengthening the nanowires too much. The longer the nanowires, the more difficult it is to maintain electrical properties over their length (particularly in the case of carbon nanotubes), or to maintain the vertical alignment. Also, a longer nanowire translates to a longer process, e.g., the growth must continue for a longer period of time to achieve the extended length.

The substrate 10 containing the sensing circuitry is also referred to herein as the circuit substrate. The circuit substrate 10 may comprise a flat surface or a macroscopically non-flat or curved surface, e.g., a robot's finger tips. Where the circuit substrate is non-flat in a macroscopic sense, the contact pads may still be essentially flat in a microscopic sense. The nanowires may be grown directly on the circuit substrate, e.g., by use of an in-situ growth process. For example, the nanotubes may be grown using area-selective chemical vapor deposition on a patterned, catalytic nucleation film. Such a film for growing nanowires may be formed of Ni, Co, Fe, or TiN. Alternatively, the nanowires may be pre-fabricated and then bonded onto the contact pads. Soldering methods suitable for performing such bonding are described in U.S. patent application Ser. No. 09/426,453, filed by Brown et al., an inventor herein, assigned to the present assignee, and incorporated herein by reference (hereinafter referred to as the "Brown Nano-Interconnection application"). When separately grown, the nanowires may be fabricated on a dissolvable substrate, a process that is described further below.

Figure 1B:
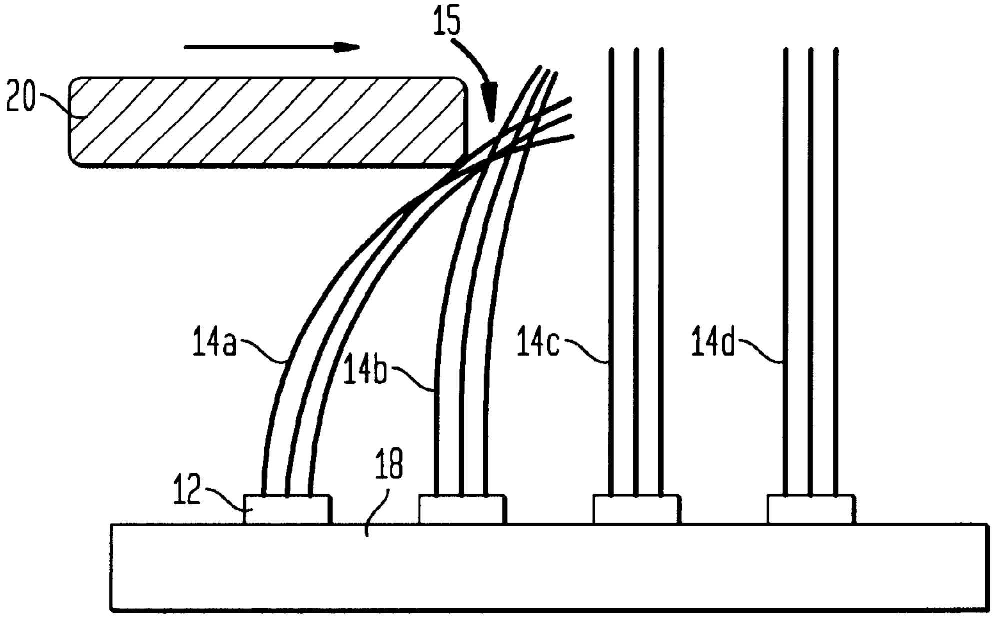
FIG. 1B illustrates the view of FIG. 1A in combination with an object laterally contacting the sensor.
Figure 2:
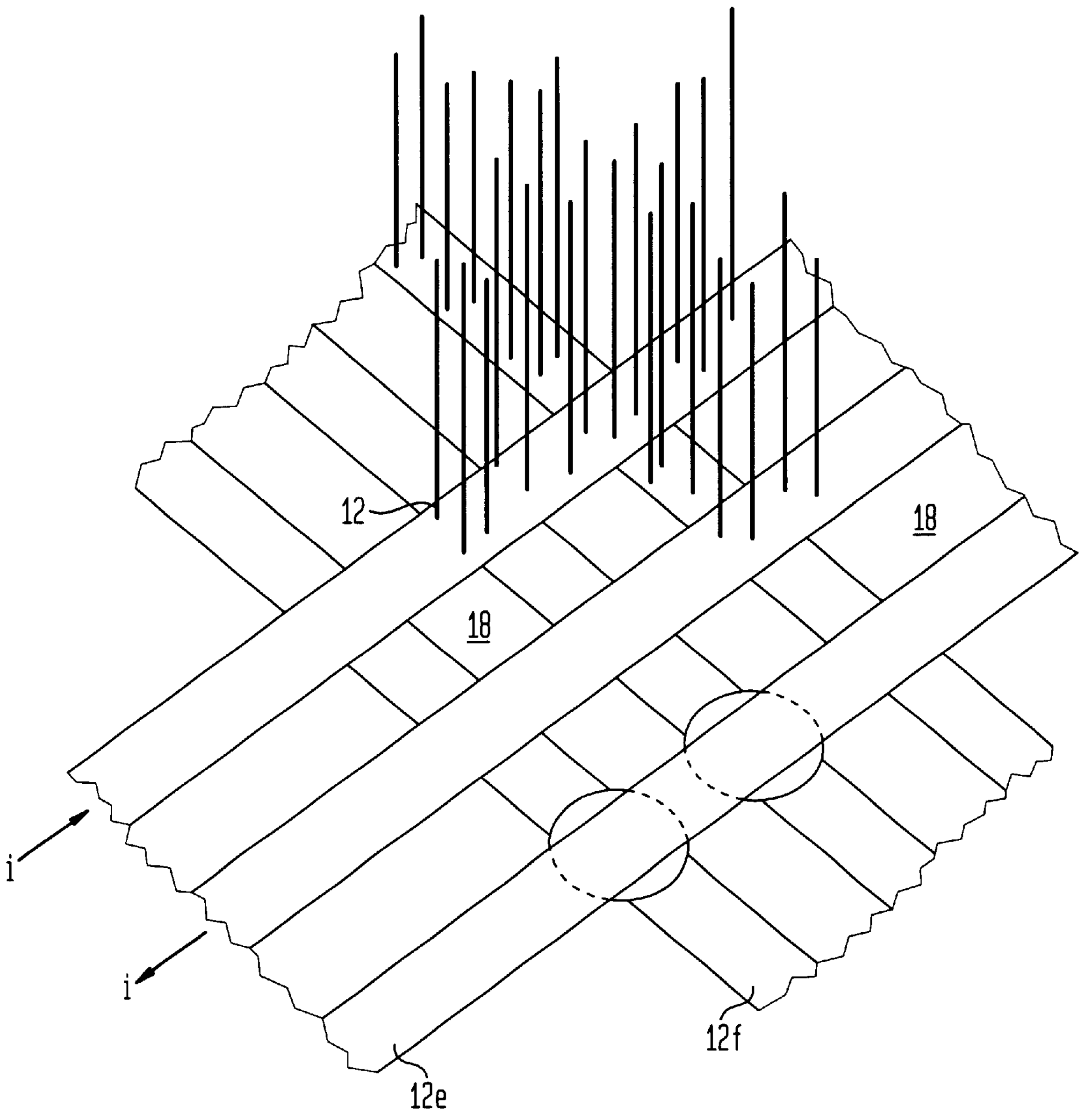
FIG. 2 schematically illustrates a top perspective view for an alternative embodiment of the inventive sensor.

The array of contact pads may be formed from isolated pads or from a matrix of contact positions. FIGS. 1A–1B show side views reflecting isolated pads. The shape of the pads is not important, e.g., they may be square, rectangular, circular, or take other shapes. When isolated pads are used, the circuit substrate 10 may have vias (not shown) disposed therein with lead conductors placed in the vias and connected to the isolated pads for providing a mechanism for interrogating the isolated contact pads to determine whether there has been an electrical connection between the pads of the array. To avoid use of such lead wires, a matrix array of contact positions is preferably used. For example, FIG. 2 shows a top view of the sensor where the array of contact pads comprises an x-y matrix of contact positions formed with intersecting parallel conductive strips 12*e*, 12*f*. The x-y matrix may be formed by various deposition or patterning methods known in the field. For example, the matrix may be formed by thin film deposition and lithographic patterning. The thin film deposition may involve physical vapor deposition (such as sputtering or evaporation), chemical vapor deposition, or electrodeposition, such as with electroless or electrolytic plating. The deposition may be followed by optical, electron, or X-ray lithographic techniques. The patterned thin films may comprise Au, Cu, Al, or other conductive materials known in the field.

In any case, the size of the contact pads (or contact positions) depends on the desired resolution of the tactile sensing and size of the nanowires. For high-resolution sensing, the spacing "s" between each contact pad of the array or position on the array ordinarily is less than about 50 micrometers, preferably less than 2 micrometers, and even more preferably less than 200 nm. Resolution of the sensing will be enhanced by increasing the concentration of nanowires on the contact pads, e.g., using a multiplicity of nanowires per contact pad area which enhances the probability and resolution of tactile sensing through the lateral electrical contact of nanowires.

FIG. 1B schematically shows the view of FIG. 1A in operation, e.g., being contacted by an object 20. The object 20 may laterally contact the surface of the sensor as shown in FIG. 1B, e.g., with the object contacting the vertical sides of a plurality of nanowires. The nanowires allocated to each of the respective contact pads will be referred to herein as a "set" of nanowires, e.g., four sets are shown in FIG. 1B, a first set 14*a*, a second set 14*b*, a third set 14*c*, and a fourth set 14*d*. Each set 14*a*, 14*b*, and 14*c* is shown as comprising three nanowires. However, it should be understood that the "set" of nanowires may comprise just one nanowire or a plurality of nanowires. When the object 20 contacts the first set of nanowires 14*a*, those nanowires elastically bend and make contact (e.g., at 15), with the second set 14*b* of nanowires. An electrical connection between the first and second set of nanowires (and the contact pads on which they are positioned) is thus made possible.

The location at which the object contacts the sensor can be detected based on the criterion of electrical connection/no-connection between pairs of contact pads. The sensor is capable of detecting the position, area, direction of movement, and intensity or strength of the tactile contact (e.g., the contact of the object with the sensor). These factors will be referred to herein generally as the position and movement activity of the object. The position and movement activity can be evaluated by interrogating pairs of contact pads to determine whether an electrical connection has been made between adjacent sets of nanowires. "Tactile activation" as used herein means that the sensor has been activated by an object contacting a set of nanowires to cause the set of nanowires to make contact with an adjacent set of nanowires and create an electrical connection between contact pads. Whether this connection has been made can be sensed by sending a current pulse to the contact pads and measuring the electrical resistance. The location of the object can be determined quantitatively based on the number of pad pairs (or nanowire sets) being electrically connected at any moment. The time sequence at which the electrical connections are effected provides information on the direction of the tactile movement. The contact pads can be interrogated sequentially or simultaneously to detect the electrical connection. The intensity of the tactile force on the sensor may be determined in various ways, such as, for example, by evaluating the enhanced physical contacts and reduced contact resistance between nanowires that are bent and in contact. The value of the electrical resistance between connected pads will be altered with the applied force due to the pads being normalized per unit shear contact area.

Figure 3A:
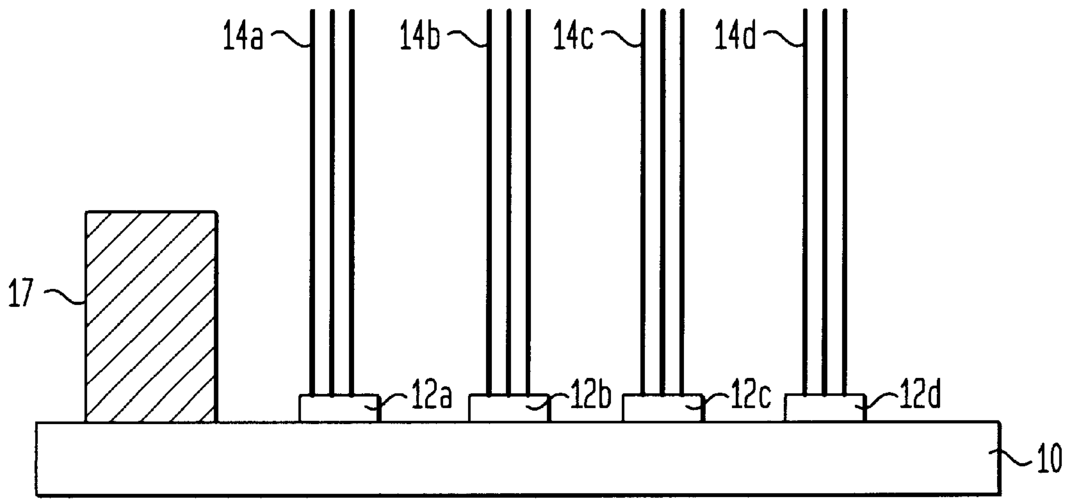
FIG. 3A schematically illustrates a cross-sectional side view of an embodiment of the inventive sensor including use of a spacer.
Figure 3B:
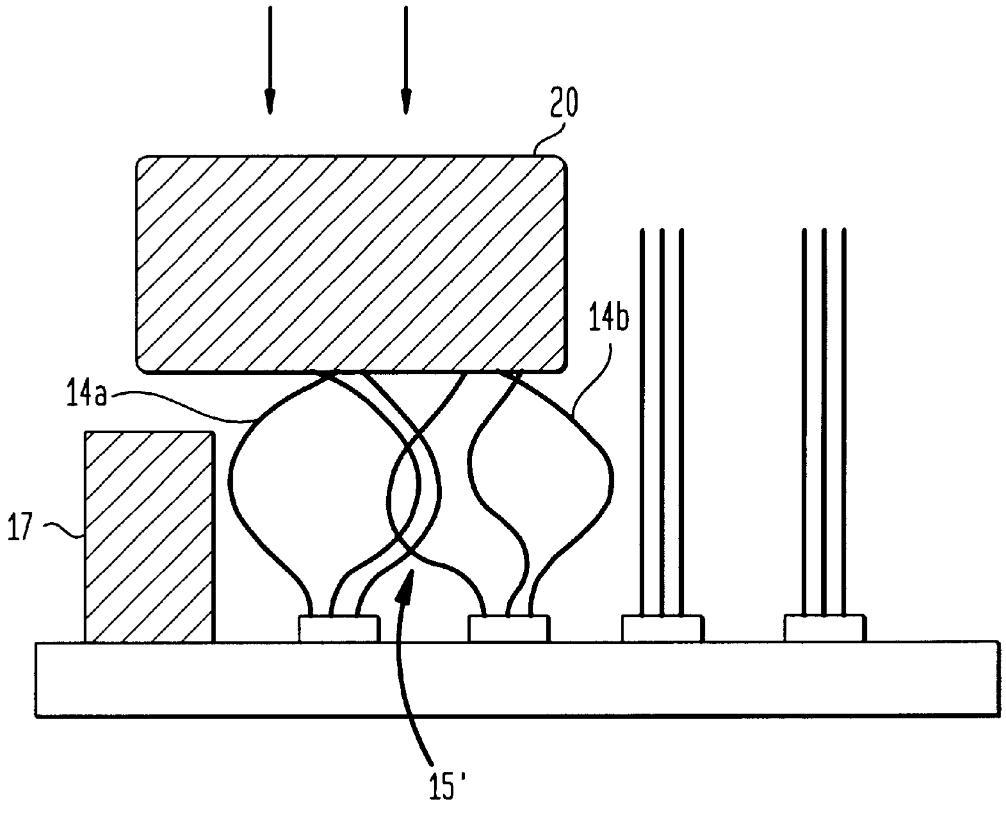
FIG. 3B illustrates the view of FIG. 3A in combination with an object vertically contacting the sensor.
Figure 4:
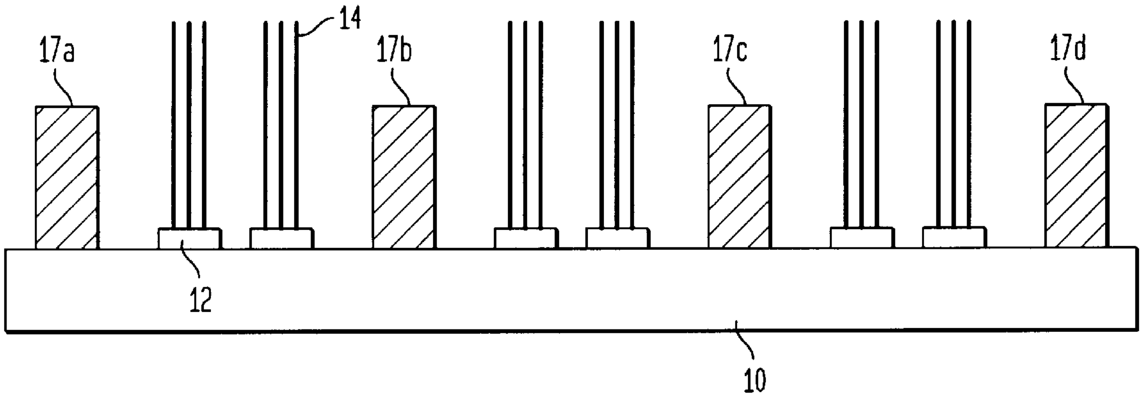
FIG. 4 schematically illustrates a cross-sectional side view of an embodiment of the sensor including use of a plurality of stress-limiting spacers.

The inventive sensor also may be used to detect strictly vertical forces with no shear (e.g. lateral) components, as illustrated in FIGS. 3A–3B. FIG. 3A shows the substrate 10, contact pads 12*a*, 12*b*, 12*c*, 12*d*, and nanowire sets 14*a*, 14*b*, 14*c*, and 14*d*. In this embodiment, a spacer 17 is also disposed on the substrate. The spacer 17 functions to prevent damage to the nanowires from excessive shear or vertical forces. For example, FIG. 3B shows an object 20 applying a vertical force on the first two sets 14*a*, 14*b* of nanowires. The vertical force causes the nanowires to elastically bend and buckle, resulting in a lateral physical contact 15' between the two sets 14*a*, 14*b* of nanowires. However, if the applied tactile force were very large, it might cause permanent damage to the nanowires, e.g., through breakage, deformation, permanent bending, distortion of the aligned configuration, and so forth. The spacer 17 can serve as a barrier to prevent such permanent damages. As shown in FIG. 4, a plurality of spacers 17*a*, 17*b*, 17*c*, 17*d* also may be used and placed at various locations on the substrate 10 between individual contact pads or pairs of pads, or between a multiplicity of pads, as shown in FIGS. 3A–3B. The spacers may be added to the substrate either before or after the nanowires are attached to the substrate. When the nanowires are separately attached to the substrate (as opposed to being grown in-situ thereon), advantageously the spacers are added before the nanowires are attached as in that instance, the spacers may assist in preventing the nanowires from collapsing during handling. Thin film deposition techniques can be used to add the spacers, as are known in the field.

FIGS. 5A–5D schematically illustrate various configurations of nanowires grown on a substrate 10. The nanowires may comprise carbon nanotubes; semiconductor nanowires fabricated, for example, with Si, Ge, or GaAs; or nanowires fabricated with any other conductive or nonconductive materials known in the field, such as oxides, carbides, nitrides, borides, or mixed ceramics. Methods for fabricating the nanowires may comprise laser ablation, arc discharge, or chemical vapor deposition of a precursor gas or mixture of precursor gases. Small diameter nanowires may be nucleated and grown upward from the circuit substrate by catalytic decomposition of a gas phase. In this case, a catalytic film may be deposited on the substrate and fine-scale, local nucleation of this film may be initiated with catalytic decomposition in a gas phase. For example, a glass circuit substrate may be provided, a catalytic film comprising a transition metal may be deposited on the glass substrate, and then carbon nanotubes may be fabricated by decomposing $C_2H_4$ on the film surface. The catalytic film is also referred to herein as the catalytic nucleation film; it may be comprised of Ni, Co, or Fe, or other materials known in the field.

Figure 5A:
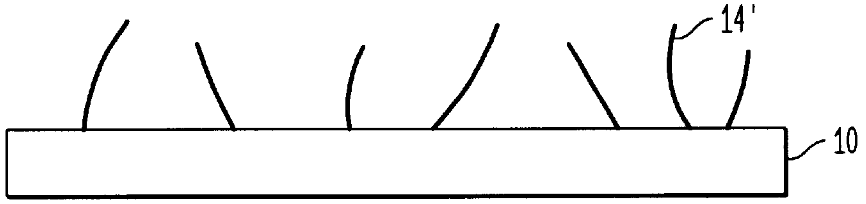
FIGS. 5A–5D schematically illustrate various configurations of nanowires grown on a substrate.
Figure 5B:
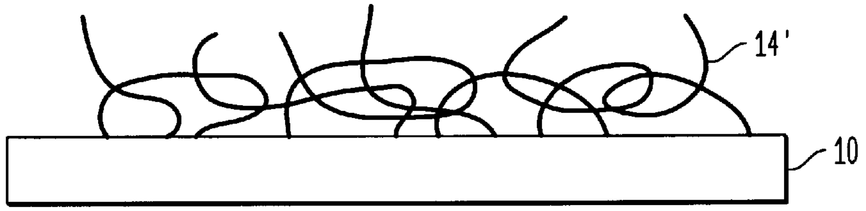

In the absence of alignment processing, the nanowires tend to grow as randomlyoriented or tangled nanowires 14', as shown in FIGS. 5A and 5B, respectively. A tangled morphology of nanowires 14' (FIG. 5B), also may be obtained with use of laser ablation. However, advantageously for the inventive sensor, the nanowires are substantially vertically aligned. The nanowires may be aligned as they are fabricated, e.g., by using an applied electrical field, gas concentration gradient, or temperature gradient. Also, the nanowires may be aligned by physical techniques using recessed vertical cavities in the substrate or by crowding, e.g., simultaneously fabricating a "dense forest" of nanowires (e.g., a high concentration in a small diameter area). A porous ceramic or silicon layer may be used in combination with a catalytic nucleation film to enhance aligned growth of the nanowires. The aligned nanowires may be of a non-uniform length 14", as in FIG. 5C, or of a uniform length 14, as in FIG. 5D. The embodiment shown in FIG. 5D is preferred, that is, where the nanowires are substantially aligned and substantially equal in length. The length of each of the nanowires preferably deviates from the average nanowire length by less than 20% and more preferably by less than 10%.

The aligned nanowires 14 should be laterally separated in the absence of a tactile force. Referring to FIGS. 1B and 2, the nanowires may be positioned on the contact pads (FIG. 1B), or strips (12*e*, 12*f* of FIG. 2), or they also may be positioned on the inter-pad insulating surface 18. However, to enhance the accuracy of the tactile sensing position, preferably the nanowires are present only on the contact pads 12 or strips 12*e*, 12*f* Selective growth of the nanowires at such positions can be accomplished by selectively depositing or patterning a thin film catalytic nucleation film on selected areas of either the circuit substrate 10 in FIG. 5 (when grown in-situ) or the separate dissolvable layer 22 in FIG. 6 (when separately grown).

The nanowires may be directly grown on the circuit substrate, as previously described. Alternatively, the wires may be grown on a separate substrate and then transferred to the circuit substrate to be bonded thereon, for example, as by solder bonding. Methods for solder bonding are described in the co-pending Brown Nano-interconnection application, referenced above. The "separate substrate" (also referred to herein as the substrate layer 22 or dissolvable substrate) advantageously is formed of a dissolvable material which aids in transferring the nanowires to the circuit substrate, as explained below. The dissolvable substrate layer may be dissolvable in water, acid, base, or solvents. For example, sodium chloride crystal may be used to fabricate a water-soluble substrate. To fabricate an acid-dissolvable substrate, metals such as Cu, Ni, Co, Mo, Fe, V, Au, Ag, or their alloys may be used. To fabricate a base-dissolvable substrate, metals such as Al may be used. Alternatively, dissolvable polymer materials may be used to fabricate the separate substrate layer, such as polyvinyl alcohol, polyvinyl acetate, polyacrylamide, acrylonitrile-butadiene-stirene, or volatile (evaporable) materials such as polymethylmethacrylate (PMMA). When polymers are used, the temperature used in processing the nanowires should be sufficiently low to avoid damaging the polymer, such as through decomposition, change in physical shape, or change in chemical properties. A combination of materials also may be used to fabricate the dissolvable substrate layer. The dissolvable substrate may be coated with a catalytic nucleation film (e.g., Ni, Fe, or Co) to grow the nanowires. After the nanowires are grown, the dissolvable layer can be removed. The catalytic nucleation film may be deposited on the dissolvable layer as a continuous layer or in a spotted or patterned manner, e.g., by sputtering, evaporation, or electrochemical deposition.

Figure 5C:
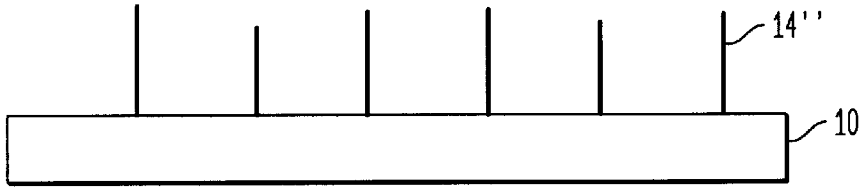
Figure 5D:
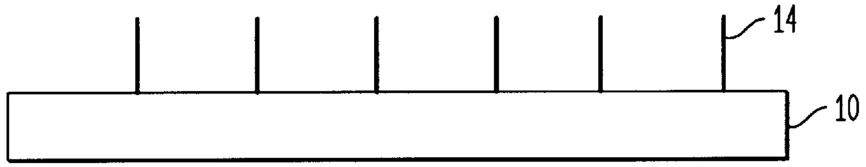
Figure 6A:
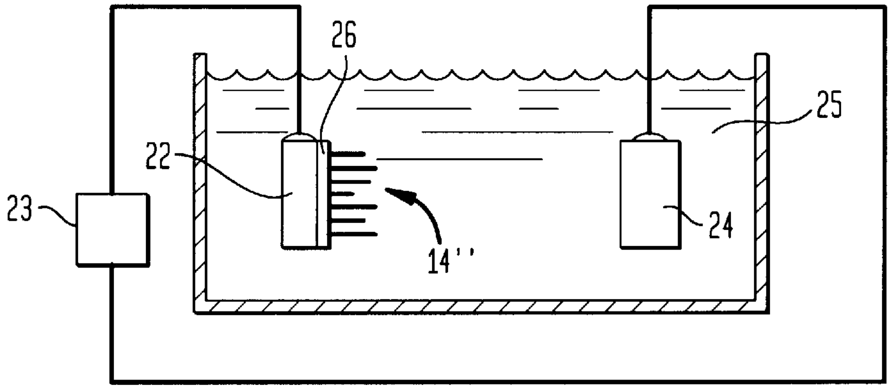
FIGS. 6A–6D schematically illustrate an exemplary process for equalizing nanowires to substantially the same length for use in the sensor.
Figure 6B:
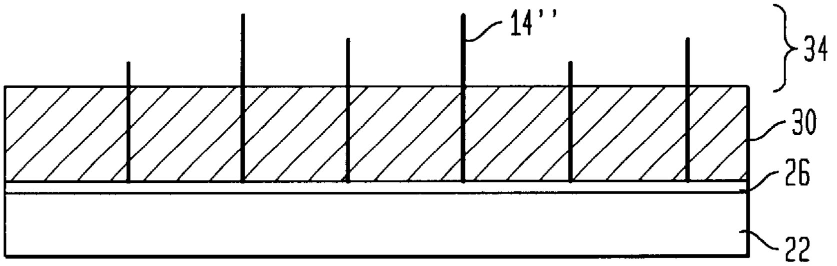

Nanowires may be first grown of unequal length, as shown in FIG. 5C, and then an equalization process applied to achieve substantially equal length nanowires, as shown in FIG. 5D. As mentioned, substantially equal-length nanowires are preferred. See, for example, U.S. patent application Ser. No. 09/354,928, "Nanoscale Conductive Connectors and Methodfor Making Same," filed Jul. 15, 1999, by Choi and Jin, inventors herein, which is incorporated herein by reference. An example of an equalization process is schematically illustrated with reference to FIGS. 6B–6D. The equalization process of this example comprises essentially three steps, i.e. (1) embedding unequal length nanowires in a dissolvable sacrificial layer 30 having a substantially uniform thickness (FIGS. 6A–6B); (2) removing an extra length 34 of nanowires protruding from the sacrificial layer (FIG. 6C); and (3) removing the sacrificial layer (FIG. 6D). Of course, it is understood that other equalization processes in the field may be used, such as laser cutting and hot blade cutting. See, e.g., U.S. patent application Ser. No. 09/236,933 filed by Jin, the inventor herein, on Jan. 25, 1999, incorporated herein by reference.

In the exemplary process of FIGS. 6A–6D, the first step involves depositing a sacrificial layer of substantially uniform thickness. FIG. 6A shows an electroplating apparatus and process for depositing the sacrificial layer 30 on a substrate 22 having unequal length nanowires 14". In this example, a copper (Cu) dissolvable substrate layer 22 is provided, on which is deposited a catalytic nucleation layer 26 of nickel (Ni) having a thickness of about 1–100 nm. Of course, other materials as aforementioned may be used for the dissolvable substrate layer 22 or nucleation layer 26. The nucleation layer 26 is shown in the figures as a continuous layer. However, the nucleation layer (e.g., even when deposited as a continuous layer) may break up into segments or islands when heated, e.g., during chemical vapor deposition and nanowire growth. Such segmentation of the nucleation layer leaves the surface of the dissolvable substrate between nanowires depleted, without an overlying conducting metal film. Depending on the materials comprising the dissolvable substrate, it may be difficult to coat the substrate and segmented nucleation layer with a metallic sacrificial layer 30 (described below), such as, for example, where the dissolvable substrate is insulating (e.g., comprised of sodium chloride). Thus, a non-catalytic conductive underlayer (not shown) may first be deposited on the dissolvable substrate before the nucleation layer is deposited. In other words, in FIG. 6A, an underlayer may be interposed between the dissolvable substrate 22 and the nucleation layer 26. This underlayer may be comprised of Mo or other non-catalytic conductive materials known in the field.

The Cu substrate layer 22 functions as a cathode in this process; it is positioned in a bath of electrolytic material 25 adjacent an anode 24 (e.g., of nickel) and coupled with the anode through power supply 23. The electrolyte 25 contains ions of the metal to be deposited, e.g., Ni from a solution containing $NiSO_4$ or Cu from a solution of $CuSO_4$. Preferably, the electrolyte bath 25 contains the same type of ions as those of the nucleation layer 26 or conductive underlayer. In this way, electrodeposition of the sacrificial layer 30 will occur on the surface of the nucleation layer 26 instead of on the nanowires 14", such as carbon or silicon nanowires, due to chemical affinity, e.g., the sacrificial layer 30 has the same metallic characteristics as the nucleation layer and substantially different characteristics from the nanowires. The sacrificial layer is deposited to a thickness that is substantially the same as the desired length of the nanowires. This parameter (nanowire length) will depend on the desired application for the sensor, but typically it will be in the range of 1 to 100 micrometers, as mentioned above. The thickness of the sacrificial layer may be controlled with processing variables, such as time, temperature, electrolyte concentration, current density, and so forth. Of course, FIG. 6A reflects one exemplary method for depositing the sacrificial layer. The sacrificial layer can be deposited by other methods, such as electroless plating, chemical vapor deposition, or physical vapor deposition, including sputtering, evaporation, laser ablation, or ion beam deposition.

FIG. 6B shows the structure obtained via the electrodeposition process of FIG. 6A comprising the dissolvable substrate layer 22; the nucleation layer 26; and the unequal length nanowires 14" embedded in the sacrificial layer 30 of substantially uniform thickness. The nanowires 14" each have an exposed extra-length portion 34 protruding beyond the sacrificial layer 30. The sacrificial layer 30 temporarily protects the buried nanowires while the extra-length portion 34 is removed. The sacrificial layer desirably is comprised of an easily-removable material, e.g., one that is removable by dissolving it in water or a solvent, by chemical or electrochemical etching, or by vaporizing through heating. Examples of suitable water-soluble or solvent-soluble materials include salts such as sodium chloride, silver chloride, potassium nitrate, copper sulfate, and indium chloride, or organic materials such as sugar and glucose. Examples of suitable chemically-etchable materials include metals and alloys such as Cu, Ni, Fe, Co, Mo, V, Al, Zn, In, Ag, Cu—Ni, and Ni—Fe. Sacrificial layers formed of these materials may be dissolved away in an acid such as hydrochloric acid, aqua regia, or nitric acid, or in a base solution such as sodium hydroxide or ammonia. Suitable vaporizable materials include those that exhibit high vapor pressure such as Zn, or which can be decomposed or burned away by heat treatment in a suitable oxidizing, reducing, or neutral gas atmosphere, such as organic acids.

Figure 6C:
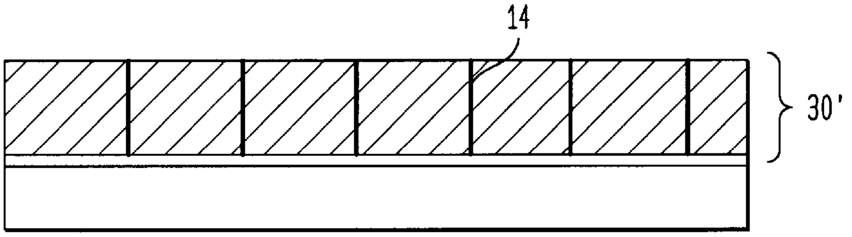
Figure 6D:
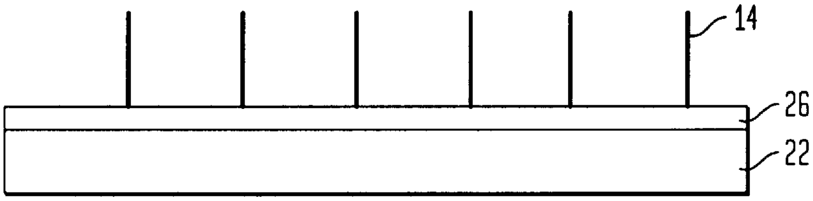

A next step of the equalization process involves removing the exposed portions 34 f the nanowires to obtain the equi-length nanowires 14 embedded in the sacrificial layer 30', as shown in FIG. 6C. This removal may be performed by polishing or etching the exposed portions 34, e.g., by chemical or mechanical methods. Heating also may be used, which is preferred when carbon nanowires are used. For example, the extra-length portion 34 may be removed by heating the structure in an oxidizing atmosphere, e.g., at temperatures in the range of 200 to 1000° C. A full or partial oxygen or ozone atmosphere may be used. Alternatively, mechanical polishing may be used to remove the extra length of the nanowires. In the next step, the sacrificial layer 30' having equal length nanowires (FIG. 6C) is removed, e.g., by being dissolved away. The structure of FIG. 6D is thus achieved, having the substrate 22, nucleation layer 26, and substantially equal-length nanowires 14.

In removing the sacrificial layer 30', the nucleation layer 26 should remain on the dissolvable substrate 22, because otherwise, the nanowires may detach from the substrate 22. If the sacrificial layer comprises a non-metallic layer such as sodium chloride, copper sulfate, or polyvinyl alcohol, the sacrificial layer may be removed with the nucleation layer remaining in tact. However, if the sacrificial layer comprises a metal layer, removal of the sacrificial layer, such as by acid etch, may result in removal of the nucleation layer, such that the nanowires are detached from the substrate. To address this situation, the sacrificial layer may be partially etched (e.g., to one-half or one-third its original thickness), to expose a sufficient length of the nanowires for connecting the exposed ends of the nanowires to a circuit device. In this case, the remaining sacrificial layer may be removed later, e.g., when the dissolvable substrate and nucleation layer are removed. Advantageously, the dissolvable substrate is coated with a temporary protective layer (not shown) to protect it (e.g., from deformation, from being dissolved, etc.) during intermediate processing steps. The protective layer may be applied to the back and/or sides of the dissolvable substrate. It may comprise a lacquer-type material that is easily removed with solvents (e.g., alcohol or acetone) but stable in aqueous solutions. The materials comprising the dissolvable substrate 22, nucleation layer 26 and sacrificial layer 30 may be selected so that they have sufficient differential etching or removal rates to avoid dissolving the nucleation layer with removal of the sacrificial layer and/or to avoid damage to the dissolvable substrate during processing.

Figure 7A:
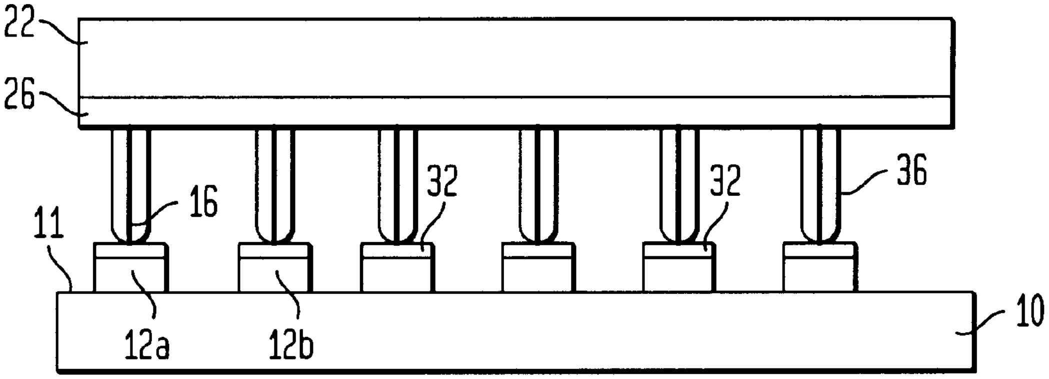
FIGS. 7A and 7B schematically illustrate an exemplary process for attaching nanowires to a substrate in connection with the fabrication of the inventive sensor.

The nanowires may be coated with a thin film or coating 36 of an electrically conductive and preferably bondable (solderable) metal or alloy (FIG. 7A). Optionally an adhesive-promoting layer (not shown) may be deposited between the coating 36 and the nanowire 14. Metallizing the nanowires may be helpful to ensure that there is electrical conduction along the length of the nanowires. The coating 36 may be applied to at least a portion of the nanowires and comprise a thin film of electrically conductive and preferably bondable (solderable) metal or alloy, for example, a solderable metal film such as Au, Ag, Pd, Rh, Ni, Cu, In, Sn, or a solder alloy film such as Au—Sn, Sn—Ag, Pb—Sn, Bi—Sn, In—Sn, or In—Ag. The adhesion-promoting interface layer between the coating and nanowire may comprise a carbide forming element (e.g., Ti, Mo, Nb, V, Fe, W, Zr). The solderable layer as well as the adhesion-promoting layer can be added onto the nanowire surface by a number of processing approaches such as physical vapor deposition (sputtering, evaporation, ion-beam deposition), chemical vapor deposition, electroless or electrolytic deposition, or a combination of deposition techniques. The desirable thickness of the metallic or solderable layer as well as the interface adhesion-promoting layer (if needed) is typically in the range of 5–50 nanometers, and preferably is in the range of 1–20 nanometers.

The metallic film coated on the nanowires may serve several important functions.

i) It provides solderability for attaching the nanowires to the circuit substrate. A solderable metal or solder alloy coating is desirably also added to the surface of the electrical contact pads onto which the nanowires are to be bonded.

ii) It may impart a uniform electrical conductivity especially to nonmetallic nanowires, e.g., to semiconducting carbon nanotubes, semiconductor nanowires such as Si or Ga—As, or insulating nanowires such as $Al_2O_3$, $SiO_2$, BN, or other insulating ceramic nanowires. In fabricating efficient and reliable vertical interconnections, a stable electrical continuity from one end of the nanowire bonded to a bottom circuit device, through the nanowire length, and to the other end of the nanowire bonded to an upper device or the upper circuit layer is important. Single-wall nanotubes can be metallic with the "armchair" configuration of carbon atoms or semiconducting to near insulating with the "zig-zag" type configuration or certain "chiral" configurations. See Dresselhous et al., *Science of Fullerines and Carbon Nanotubes,* Chap. 19 (Academic Press, San Diego 1996), at pp. 758, 805–809. It is also known that the nanotube atomic arrangements and hence electrical properties may vary drastically along the length of a single carbon nanotube. See Collins et al., Science, Vol. 278, p. 100 (Oct. 3, 1997). Such a variation in electrical properties may adversely effect the efficient electron transport between nano-interconnected devices via the carbon nanotube interconnection medium. The metal surface coating on the nanowires as herein described addresses this problem and provides the desired electrical conductivity to the vertical nano-interconnection medium.

iii) It provides corrosion/oxidation resistance to the solderable coating (and also to the nanowires themselves if they are susceptible to corrosion/oxidation) upon exposure to ambient or processing atmospheres. Noble metal films such as Au, Ag, Pd, Rh, and so forth can be utilized either as the coating itself or as an added overcoating on top of the solderable metal coating 36 deposited on the nanowire. A thin overcoating of noble metal such as Au can be easily absorbed into the underlying molten solder, e.g. Au—Sn or Pb—Sn eutectic solder, during the soldering process and thus does not prevent the bonding.

Figure 7B:
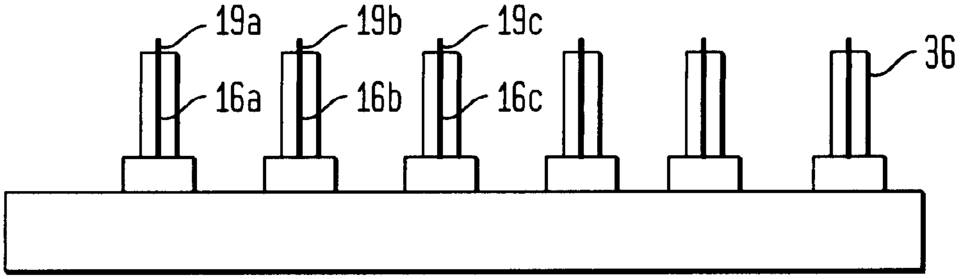

When the nanowires are separately grown, they of course need to be attached to the circuit substrate 10 (FIG. 1A). An exemplary method for attaching the wires to the substrate is illustrated in FIGS. 7A–7B. In this example, the attachment is achieved by placing the structure of FIG. 6D "upside down" on the circuit substrate 10, e.g., where the tips 16 (FIG. 6D), are in contact with the surface 11 of the substrate 10 having contact pads 12*a*, 12*b*, etc. thereon (FIGS. 1A, 7A). The surface 11 and/or contact pads 12*a*, 12*b*, etc. also may be coated with a solder layer 32. Spacers 17 (FIGS. 3A, 3B, 4) placed on surface may be used to assist in positioning the nanowires vertically on the substrate 10 with optimal contact force while preventing the nanowires from collapsing. When the nanowires are thus positioned in contact with the substrate 10 (e.g., FIG. 7A), the structure may be heated to induce solder bonding of the nanowires onto the substrate 10.

The dissolvable layer 22, catalytic nucleation layer 26 (if present), and any remaining sacrificial layer may be dissolved away to provide the structure of FIG. 7B. The top portions 19*a*, 19*b*, etc., of the nanowires will be exposed while the bottom portions (tips 16*a*, 16*b*, 16*c*, etc.), are bonded to the substrate. The nanowires may then be further metallized to ensure electrical conduction along their length.

It is understood that the embodiments described herein are merely exemplary and that a person skilled in the art may make many variations and modifications without departing from the spirit and scope of the invention. All such variations and modifications are intended to be included within the scope of the appended claims.

What is claimed is:

1. A tactile sensor device for detecting the position and movement activity of an object, the sensor device comprising:

a circuit substrate having a surface;

at least a first and a second contact pad disposed on the surface;

at least one nanowire attached to the first contact pad to define a first set of nanowires and at least one nanowire attached to the second contact pad to define a second set of nanowires; wherein when the object contacts the first set of nanowires, the object causes the first set of nanowires to bend and make contact along a portion of the length thereof with the second set of nanowires, whereby the position and movement activity of the object can be sensed by electrically interrogating at least one of the first and second contact pads to determine whether the first and second sets of nanowires have made a connection.

2. The device of claim 1 in which the tactile sensor device comprises a tactile shear sensor.

3. The device of claim 1 in which the contact pads are defined by intersecting strips of conductive material.

4. The device of claim 1 in which the nanowires of each said set are substantially equal in length and substantially vertically aligned relative to the circuit substrate.

5. The device of claim 1 further comprising at least one spacer disposed on the surface of the circuit substrate for preventing damage to at least one of the sets of nanowires.

6. The device of claim 1 attached by growing the nanowires directly on the contact pads by an in-situ growth process.

7. The device of claim 1 attached by growing the nanowires on a dissolvable layer, solder bonding the nanowires onto the circuit substrate, and removing the dissolvable layer.

8. A tactile sensor device for detecting the position and movement activity of an object, the sensor device comprising:

a circuit substrate having a surface;

an array of contact pads on the surface of the circuit substrate, wherein each one of the contact pads defining the array is in the absence of a tactile activation, electrically isolated from each of the other contact pads defining the array;

a set of nanowires attached to each said one of the contact pads, each set of nanowires comprising a plurality of substantially-vertically aligned and substantially equilength nanowires;

wherein when the object contacts at least one set of nanowires, the object causes said at least one set of nanowires to bend and make contact along a portion of the length thereof with at least another set, whereby the position and movement activity of the object can be sensed by electrically interrogating at least one of the contact pads to determine whether a connection has been made between sets of nanowires.

9. The device of claim 8, in which the length of each one of the plurality of nanowires deviates from the average length of every one of the plurality of nanowires by less than twenty percent.

10. The device of claim 8, in which each one of the plurality of nanowires deviates from complete vertical alignment of 90 degrees relative to the circuit substrate by less than twenty-five degrees.

11. The device of claim 8 in which each said set of nanowires comprises at least five nanowires.

12. The device of claim 8 in which the average diameter of the plurality of nanowires is less than 200 nm.

13. The device of claim 8 in which the average length of the plurality of nanowires is in the range of about 1 to 100 micrometers.

14. The device of claim 8 in which the plurality of nanowires comprise single-wall or multi-wall carbon nanotubes, semiconductor nanowires, or ceramic nanowires.

15. The device of claim 14, in which the semiconductor nanowires comprise at least one of Si, Ge, and GaAS and the ceramic nanowires comprise at least one of an oxide, nitride, carbide, or boride.

16. The device of claim 8 in which the surface of the circuit substrate comprises a non-flat surface.

17. The device of claim 8 in which the array of contact pads comprises a matrix of contact positions.

18. The device of claim 17, in which the matrix of contact positions comprises intersecting strips of conductive material.

19. The device of claim 8, in which each one of the contact pads defining the array of contact pads is separated from any other contact pad defining the array by a distance of less than 50 micrometers.

20. A tactile shear sensor device for detecting the position and movement activity of an object, the sensor device comprising:

a circuit substrate having a surface;

an array of contact pads on the surface of the circuit substrate, wherein each one of the contact pads defining the array, is in the absence of a tactile activation, electrically isolated from each of the other contact pads, and each said one of the contact pads is configured to be coupled to a mechanism for electrically interrogating said contact pads;

a set of nanowires attached to each said one of the isolated contact pads, each set of nanowires comprising a plurality of nanowires, in which the length of each one of the plurality of nanowires deviates from the average length of every one of the plurality of nanowires by less than twenty percent and the vertical alignment of the plurality of nanowires deviates from complete vertical alignment of 90 degrees relative to the circuit substrate by less than twenty-five degrees;

a metallic coating disposed on the outer surface of the plurality of nanowires;

a plurality of stress-limiting spacers disposed on the surface of the circuit substrate for preventing damage to the sets of nanowires;

wherein when the object contacts at least one set of nanowires, the object causes said at least one set of nanowires to bend and make contact along a portion of the length thereof with at least another set, whereby the position and movement activity of the object can be sensed by electrically interrogating at least two of the contact pads to determine whether an electrical connection has been made between them.

* * * * *